(12) United States Patent
Siann et al.

(10) Patent No.: US 12,326,494 B2
(45) Date of Patent: Jun. 10, 2025

(54) ENERGY-EFFICIENT LOCALIZATION OF WIRELESS DEVICES IN CONTAINED ENVIRONMENTS

(71) Applicant: TRAKPOINT SOLUTIONS, INC., San Diego, CA (US)

(72) Inventors: Jon Siann, San Diego, CA (US); Christopher Williams, San Diego, CA (US)

(73) Assignee: TRAKPOINT SOLUTIONS, INC., San Diego, CA (US)

( * ) Notice: Subject to any disclaimer, the term of this patent is extended or adjusted under 35 U.S.C. 154(b) by 756 days.

(21) Appl. No.: 17/687,184

(22) Filed: Mar. 4, 2022

(65) Prior Publication Data

US 2022/0187435 A1 Jun. 16, 2022

Related U.S. Application Data

(63) Continuation-in-part of application No. 17/348,186, filed on Jun. 15, 2021, now Pat. No. 11,304,137.
(Continued)

(51) Int. Cl.
*G01S 11/06* (2006.01)
*G01S 11/04* (2006.01)
(Continued)

(52) U.S. Cl.
CPC ............... *G01S 11/06* (2013.01); *G01S 11/04* (2013.01); *H04W 4/029* (2018.02); *H04W 4/33* (2018.02)

(58) Field of Classification Search
CPC ........ G01S 11/06; G01S 11/04; G01S 3/8006; G01S 5/0009; G01S 11/02; G01S 5/0278; H04W 4/029; H04W 4/33; H04W 4/80
See application file for complete search history.

(56) References Cited

U.S. PATENT DOCUMENTS 4,430,700 A 2/1984 Chadima et al.
5,872,773 A 2/1999 Katzela et al.
(Continued)

FOREIGN PATENT DOCUMENTS

CN 110334788 A 10/2019
WO WO2001065271 A1 9/2001
(Continued)

OTHER PUBLICATIONS

Lien et al. "Design of Agency Communication for Contingency Cellular Network." 2018 Global Wireless Summit (GWS). IEEE, 2018, 6 pages.

*Primary Examiner* — Ayaz R Sheikh
*Assistant Examiner* — Tarell A Hampton
(74) *Attorney, Agent, or Firm* — NGUYEN TARBET IP LAW

(57) ABSTRACT

Aspects of the present invention provide systems and methods for distributed signal processing of indoor localization signals wherein statistical algorithms and machine learning are used in place of a fingerprint map. The disclosure relates to calculation of angle and distance based on measurements of an indoor localization signal, followed by energy-efficient distribution of signal processing. Local signal processing is performed using any of multiple eigen structure algorithms or a linear probabilistic inference, before cloud-based signal processing is performed using a nonlinear probabilistic inference and machine learning that's been trained with historical data transmitted by the base stations and time-of-day location patterns. Without having to generate and constantly update an energy-exorbitant fingerprint map, the disclosed system reduces localization error to merely 50 cm with 95% probability without compromising energy-efficiency to rival the accuracy of indoor localization systems that utilize fingerprinting.

20 Claims, 5 Drawing Sheets

Related U.S. Application Data which is a continuation-in-part of application No. 17/065,197, filed on Oct. 7, 2020, now Pat. No. 11,063,651, which is a continuation-in-part of application No. 16/778,577, filed on Jan. 31, 2020, now Pat. No. 10,841,894, application No. 17/687,184, filed on Mar. 4, 2022 is a continuation-in-part of application No. PCT/US2021/015432, filed on Jan. 28, 2021, which is a continuation-in-part of application No. 17/065,197, filed on Oct. 7, 2020, now Pat. No. 11,063,651, and a continuation-in-part of application No. 16/778,577, filed on Jan. 31, 2020, now Pat. No. 10,841,894, application No. 17/687,184, filed on Mar. 4, 2022 is a continuation-in-part of application No. 17/493,061, filed on Oct. 4, 2021, now Pat. No. 11,418,977, which is a continuation-in-part of application No. 17/104,757, filed on Nov. 25, 2020, now Pat. No. 11,159,962, which is a continuation-in-part of application No. 16/778,718, filed on Jan. 31, 2020, now Pat. No. 10,887,782, application No. 17/687,184, filed on Mar. 4, 2022 is a continuation-in-part of application No. PCT/US2021/015420, filed on Jan. 28, 2021, which is a continuation-in-part of application No. 17/104,757, filed on Nov. 25, 2020, now Pat. No. 11,159,962, and a continuation-in-part of application No. 16/778,718, filed on Jan. 31, 2020, now Pat. No. 10,887,782, application No. 17/687,184, filed on Mar. 4, 2022 is a continuation-in-part of application No. 17/160,892, filed on Jan. 28, 2021, now abandoned, which is a continuation-in-part of application No. 16/778,871, filed on Jan. 31, 2020, now abandoned, application No. 17/687,184, filed on Mar. 4, 2022 is a continuation-in-part of application No. PCT/US2021/015472, filed on Jan. 28, 2021, which is a continuation-in-part of application No. 17/160,892, filed on Jan. 28, 2021, now abandoned, and a continuation-in-part of application No. 16/778,871, filed on Jan. 31, 2020, now abandoned.

(51) Int. Cl.
*H04W 4/029* (2018.01)
*H04W 4/33* (2018.01)

(56) References Cited

U.S. PATENT DOCUMENTS

| | | | |
|---|---|---|---|
| 5,940,372 A | 8/1999 | Bertin et al. | |
| 6,147,965 A | 11/2000 | Burns et al. | |
| 6,593,845 B1 | 7/2003 | Freidman et al. | |
| 6,807,165 B2 | 10/2004 | Belcea | |
| 9,405,941 B2 | 8/2016 | Smith | |
| 9,419,854 B1 | 8/2016 | Wang et al. | |
| 10,613,801 B1 | 4/2020 | Matysiak et al. | |
| 10,841,894 B1 | 11/2020 | Siann et al. | |
| 10,887,782 B1 | 1/2021 | Williams et al. | |
| 11,017,661 B1* | 5/2021 | Beauchamp | H04W 4/44 |
| 11,063,651 B1 | 7/2021 | Siann et al. | |
| 11,159,962 B2 | 10/2021 | Williams et al. | |
| 11,304,137 B2 | 4/2022 | Siann et al. | |
| 2002/0006805 A1 | 1/2002 | New et al. | |
| 2002/0191573 A1 | 12/2002 | Whitehill et al. | |
| 2003/0219005 A1 | 11/2003 | Isnard et al. | |
| 2004/0140884 A1 | 7/2004 | Gallagher, III et al. | |
| 2004/0203870 A1* | 10/2004 | Aljadeff | G01S 5/06 |
| | | | 455/457 |
| 2004/0233855 A1 | 11/2004 | Gutierrez et al. | |
| 2005/0206555 A1 | 9/2005 | Bridgelall et al. | |
| 2006/0187045 A1 | 8/2006 | Heinze et al. | |
| 2006/0256802 A1 | 11/2006 | Edwards | |
| 2007/0015528 A1 | 1/2007 | Nemethova et al. | |
| 2007/0139199 A1 | 6/2007 | Hanlon | |
| 2007/0184851 A1 | 8/2007 | Barnwell et al. | |
| 2007/0205896 A1 | 9/2007 | Beber et al. | |
| 2007/0232310 A1 | 10/2007 | Schiff et al. | |
| 2007/0237072 A1 | 10/2007 | Scholl | |
| 2008/0040628 A1 | 2/2008 | Mandal | |
| 2008/0068131 A1 | 3/2008 | Cargonja et al. | |
| 2008/0130604 A1 | 6/2008 | Boyd | |
| 2008/0316105 A1* | 12/2008 | Seong | G01S 5/12 |
| | | | 342/442 |
| 2009/0085738 A1 | 4/2009 | Darianian et al. | |
| 2009/0096586 A1 | 4/2009 | Tubb | |
| 2009/0239520 A1 | 9/2009 | Inagaki et al. | |
| 2009/0267770 A1 | 10/2009 | Twitchell, Jr. | |
| 2009/0274244 A1 | 11/2009 | Jensen | |
| 2010/0019887 A1 | 1/2010 | Bridgelall et al. | |
| 2010/0039228 A1 | 2/2010 | Sadr et al. | |
| 2010/0060432 A1 | 3/2010 | van Niekerk et al. | |
| 2010/0111059 A1 | 5/2010 | Bappu et al. | |
| 2010/0223492 A1 | 9/2010 | Farrugia et al. | |
| 2010/0325550 A1 | 12/2010 | Wong et al. | |
| 2011/0026434 A1 | 2/2011 | Van Der Stok et al. | |
| 2011/0074552 A1 | 3/2011 | Norair et al. | |
| 2011/0176434 A1* | 7/2011 | Pandey | H04W 48/16 |
| | | | 370/252 |
| 2011/0223960 A1 | 9/2011 | Chen et al. | |
| 2011/0291803 A1 | 12/2011 | Bajic et al. | |
| 2012/0013508 A1* | 1/2012 | Bao | G01S 5/0263 |
| | | | 342/450 |
| 2012/0154219 A1 | 6/2012 | Snoussi et al. | |
| 2012/0161943 A1 | 6/2012 | Byun et al. | |
| 2012/0225676 A1* | 9/2012 | Boyd | G01S 5/06 |
| | | | 455/456.6 |
| 2013/0033364 A1 | 2/2013 | Raz et al. | |
| 2013/0187761 A1 | 7/2013 | Shoarinejad | |
| 2013/0217382 A1 | 8/2013 | Kudo | |
| 2013/0285794 A1 | 10/2013 | Hansen | |
| 2014/0003406 A1 | 1/2014 | Kamath et al. | |
| 2014/0023195 A1 | 1/2014 | Lee et al. | |
| 2014/0086275 A1 | 3/2014 | Kim et al. | |
| 2014/0145829 A1 | 5/2014 | Bassan-Eskenazi et al. | |
| 2014/0187258 A1 | 7/2014 | Khorashadi et al. | |
| 2014/0189443 A1 | 7/2014 | Xu et al. | |
| 2014/0213279 A1 | 7/2014 | Hiltunen | |
| 2014/0269643 A1 | 9/2014 | Sun | |
| 2014/0281670 A1 | 9/2014 | Vasseur et al. | |
| 2014/0282974 A1 | 9/2014 | Maher et al. | |
| 2014/0337434 A1 | 11/2014 | Hansen | |
| 2014/0341379 A1 | 11/2014 | Fairbanks et al. | |
| 2014/0372775 A1 | 12/2014 | Li et al. | |
| 2015/0015371 A1 | 1/2015 | Hansen | |
| 2015/0215762 A1* | 7/2015 | Edge | H04W 8/005 |
| | | | 370/338 |
| 2016/0127871 A1 | 5/2016 | Smith et al. | |
| 2016/0294796 A1 | 10/2016 | Hidayat et al. | |
| 2016/0309345 A1 | 10/2016 | Tehrani et al. | |
| 2016/0353363 A1 | 12/2016 | Yaginuma et al. | |
| 2017/0041750 A1 | 2/2017 | Jose et al. | |
| 2017/0064599 A1 | 3/2017 | Caine et al. | |
| 2017/0086082 A1 | 3/2017 | Narayanan | |
| 2017/0232325 A1 | 8/2017 | Hansen | |
| 2017/0347292 A1 | 11/2017 | Ho et al. | |
| 2018/0075728 A1 | 3/2018 | Liu | |
| 2018/0124677 A1 | 5/2018 | He et al. | |
| 2018/0164398 A1 | 6/2018 | Olsen et al. | |
| 2018/0167783 A1* | 6/2018 | Khoche | B32B 37/12 |
| 2018/0184392 A1* | 6/2018 | Prechner | H04W 64/00 |
| 2018/0196972 A1 | 7/2018 | Lu et al. | |
| 2018/0218477 A1 | 8/2018 | Nakayama | |
| 2018/0270894 A1 | 9/2018 | Park et al. | |
| 2018/0374124 A1 | 12/2018 | Moshfeghi | |
| 2019/0102587 A1 | 4/2019 | Calvarese et al. | |
| 2019/0150006 A1 | 5/2019 | Yang et al. | |
| 2019/0190586 A1 | 6/2019 | Tanaka et al. | |
| 2019/0277940 A1 | 9/2019 | Safavi | |
| 2020/0064456 A1 | 2/2020 | Xu et al. | |
| 2021/0036739 A1* | 2/2021 | Kolehmainen | H04B 5/73 |

(56) References Cited

U.S. PATENT DOCUMENTS

| | | | |
|---|---|---|---|
| 2021/0058936 A1* | 2/2021 | Gordaychik | H04W 72/0453 |
| 2021/0280324 A1* | 9/2021 | Roy | H04W 84/18 |
| 2022/0007139 A1* | 1/2022 | Li | G06N 3/045 |
| 2022/0070612 A1* | 3/2022 | Henry | H04B 1/7163 |
| 2024/0248164 A1* | 7/2024 | Booij | G01S 5/0289 |

FOREIGN PATENT DOCUMENTS

| | | |
|---|---|---|
| WO | WO2021154944 A1 | 8/2021 |
| WO | WO2021154952 A1 | 8/2021 |
| WO | WO2021154983 A1 | 8/2021 |

* cited by examiner

ENERGY-EFFICIENT LOCALIZATION OF WIRELESS DEVICES IN CONTAINED ENVIRONMENTS

CROSS-REFERENCES TO RELATED APPLICATIONS

This application is a continuation-in-part and claims benefit of U.S. application Ser. No. 17/348,186 filed Jun. 15, 2021, which is a continuation-in-part and claims benefit of U.S. application Ser. No. 17/065,197 filed Oct. 7, 2020 (now U.S. Pat. No. 11,063,651) and is a continuation-in-part and claims benefit of U.S. application Ser. No. 16/778,577 filed Jan. 31, 2020 (now U.S. Pat. No. 10,841,894), the specifications of which are incorporated herein in its entirety by reference.

This application is also a continuation-in-part and claims benefit of PCT Application No. PCT/US2021/015432 filed Jan. 28, 2021, which claims benefit of U.S. application Ser. No. 17/065,197 filed Oct. 7, 2020 (now U.S. Pat. No. 11,063,651) and U.S. application Ser. No. 16/778,577 filed Jan. 31, 2020 (now U.S. Pat. No. 10,841,894), the specifications of which are incorporated herein in its entirety by reference.

This application is a continuation-in-part and claims benefit of U.S. application Ser. No. 17/493,061 filed Oct. 4, 2021, which is a continuation-in-part and claims benefit of U.S. application Ser. No. 17/104,757 filed Nov. 25, 2020 (now U.S. Pat. No. 11,159,962), which is a continuation-in-part and claims benefit of U.S. application Ser. No. 16/778,718 filed Jan. 31, 2020 (now U.S. Pat. No. 10,887,782), the specifications of which are incorporated herein in its entirety by reference.

This application is also a continuation-in-part and claims benefit of PCT Application No. PCT/US2021/015420 filed Jan. 28, 2021, which claims benefit of U.S. application Ser. No. 17/104,757 filed Nov. 25, 2020 (now U.S. Pat. No. 11,159,962) and U.S. application Ser. No. 16/778,718 filed Jan. 31, 2020 (now U.S. Pat. No. 10,887,782), the specifications of which are incorporated herein in its entirety by reference.

This application is a continuation-in-part and claims benefit of U.S. application Ser. No. 17/160,892 filed Jan. 28, 2021, which is a continuation-in-part and claims benefit of U.S. application Ser. No. 16/778,871 filed Jan. 31, 2020, the specifications of which are incorporated herein in its entirety by reference.

This application is also a continuation-in-part and claims benefit of PCT Application No. PCT/US2021/015472 filed Jan. 28, 2021, which claims benefit of U.S. application Ser. No. 17/160,892 filed Jan. 28, 2021 and U.S. application Ser. No. 16/778,871 filed Jan. 31, 2020, the specifications of which are incorporated herein in its entirety by reference.

FIELD OF THE INVENTION

The present invention generally relates to the field of radiofrequency indoor localization. In particular, the present invention relates to energy-efficient distribution of indoor localization signal processing free of a fingerprint map, such that local signal processing is performed using any of multiple eigen structure algorithms or a linear probabilistic inference, before cloud-based signal processing is performed using a nonlinear probabilistic inference and machine learning.

BACKGROUND OF THE INVENTION

For indoor localization systems comprising a plurality of radiofrequency (RF) tags and a plurality of detection points (DP), a balanced trade-off between energy-efficiency and accuracy is a primary design objective. Past indoor localization systems strove to maximize accuracy by keeping RF tags in an active state for the sake of updating the tags and DPs on each other's locations often. This limits energy efficiency due to the frequent transmissions taking place between members of the system. Research found that RF tags can switch between an active and inactive state and only communicate with DPs while active in order to save power while updating the location of each RF tag and DP enough to maintain a high level of accuracy.

Prior art indoor localization systems that are designed with RFID technology employ multiple states in RF tags by keeping them in a state of hibernation while remaining open to signal reception until the DP sends a wakeup signal to every associated tag in order to update the location. At this point, the tags are switched to an active state in order to create a network. While these systems improve energy efficiency when compared to prior systems and maintain a high level of accuracy, they are limited by the fact that the tags must always be prepared to receive a wakeup signal and that every RF tag must be kept active after receiving a wakeup signal. Thus, an indoor localization system that keeps RF tags in an even less active state, only switches tags to a receptive state at the exact time a DP sends a wakeup signal, and returns the tags to an inactive state immediately afterwards all while maintaining accuracy would improve energy efficiency even further.

Furthermore, prior art indoor localization systems that are designed with radiofrequency (RF) ID technology are limited by range constraints and power consumption (which accordingly encumbers deployment, scalability and maintenance as well). Although Wi-Fi systems make use of advantageous ubiquity, range, and a comprehensive and reliable protocol stack, Wi-Fi's energy requirements similarly make it unsuitable for indoor localization systems that have to be implemented using asset-tracking beacons that are solely battery-powered. Long-range, low-power radio technologies respectively include deep forward error correction (FEC) code radio (such as, by way of non-limiting example, LoRa) and Bluetooth Low Energy, but (as with all radio technologies applied to indoor localization) multipath interference has proven to be a pernicious impediment to accuracy.

The viability of indoor localization thus depends on overcoming significant multipath interference with a cost-effective solution that performs accurately under the paltriest energy budget. Extensive research has already explored numerous technologies and techniques for indoor localization, such as Received Signal Strength Indication (RSSI), Time of Flight (TOF), Return Time of Flight (RTOF), Time Difference of Arrival (TDOA), and Channel State Information (CSI). RSSI-based indoor localization systems are easy to implement and cost-efficient but suffer from inaccuracy due to significant multipath interference from indoor obstacles.

Refinements of the accuracy of RSSI-based localization systems typically, necessarily involve fingerprinting. Fingerprinting entails collecting RSSI measurements from various reference base stations, generating a map encompassing the field of signal strength, and storing the map in a database. Subsequent measurements received from reference nodes are then compared with the fingerprint map to find the user's location. At best, prior art systems designed around Wi-Fi technology and fingerprinting can reduce median localization error to between 39 cm and 1.5 m.

However, the improved accuracy comes at the costly expense of energy (when energy is in short supply) when calculating and generating the fingerprint map. Moreover, constantly changing environments (such as buildings with high pedestrian traffic, frequent relocation of large obstacles, and spontaneous electromagnetic interference) require constant, energy-exorbitant recalculation and regeneration of the fingerprint map, which further impairs an RSSI-based system's efficacy. This, again, is inefficient for systems that employ battery-operated tracking devices.

SUMMARY OF THE INVENTION

Alternately, an approach that eschews fingerprinting can contend with the error from significant multipath interference by filtering the RSSI distance data points with a probabilistic inference, such as (by way of non-limiting example) linear quadratic estimation. However, while filtration with linear quadratic estimation improves accuracy by 29-32%, systems deployed in environments with electromagnetic fields (such as hospitals with X Ray equipment, MRI machines, CTScan equipment, etc.) labor under greater multipath interference than normal. And so (at least by itself), the filtration of RSSI data points using a probabilistic inference is inadequate for this unique application.

Since layering additional probabilistic inferences upon the RSSI data points would have diminishing effectiveness upon noise with each layer, accuracy can best be improved through sensor fusion of RSSI distance data points with other measurements, such as AOA and TDOA. AOA and TDOA data points similarly benefit from filtration using one or more eigen structure algorithms (e.g., multiple signal classification, beamscan and/or cross-correlation) and linear quadratic estimation, respectively.

Still, experimental data indicates that there is substantial ambient interference in a hospital that cannot be resolved by even the fusion of three different sensor measurements, even after filtration of those measurements with eigen structure algorithms and probabilistic inferences. Consequently, this particularly challenging application requires training a deep neural network with historical location logs and nonlinear filtering (e.g., by way of non-limiting example, a Sequential Monte Carlo algorithm) to remove certain types of non-additive noise that were resistant to filtration by linear quadratic estimation.

A new complication, though, is that now this comprehensive approach (particularly because it involves implementing a deep neural network) consumes energy excessively. Thus, the implementation of an asset-tracking system in a hospital (without generating a fingerprint map) confronts several distinct challenges that further require the advent of distributed signal processing in an energy-efficient indoor localization system.

The present invention is directed to energy-efficient, distributed signal processing of indoor localization signals, such that local signal processing may comprise one or more of multiple signal classification, beamscan, cross-correlation, and linear quadratic estimation while cloud-based signal processing may employ a Sequential Monte Carlo algorithm and machine learning. The energy-efficient method and comprehensive system of the present invention successfully and consistently reduce the localization error to about 50 cm with 95% probability—effectively rivaling the accuracy and confidence of prior art systems that employ computation-extensive and energy-exorbitant fingerprint maps.

Specifically, a RF beacon may announce its location through at least two transmissions to a network of multiple base stations. For each transmission received, each base station may calculate the signal's angle of arrival (AOA), the distance to the RF beacon based on the received signal strength indication (RSSI), and the distance to the RF beacon based on the signal's time difference of arrival (TDOA). Each base station may use one or more eigen structure algorithms (such as, by way of non limiting example, MUltiple Signal Classification (MUSIC)) to consolidate its AOA data points into fewer MUSIC-AOA estimates. Each base station may use linear quadratic estimation (LQE) to consolidate the RSSI-calculated distances into fewer LQE-RSSI distance estimates. Each base station may also use LQE to consolidate the TDOA-calculated distances into fewer LQE-TDOA distance estimates. These MUSIC-AOA, LQE-RSSI and LQE-TDOA estimates may be separately communicated to a cloud server. The cloud server may (for each of multiple base stations) triangulate the MUSIC-AOA estimates, trilaterate the LQE-RSSI distance estimates, and trilaterate the LQE-TDOA distance estimates. The cloud server may also fuse the triangulation and trilaterations with additional algorithms such as a nonlinear Bayesian inference (such as, by way of non limiting example, a Sequential Monte Carlo algorithm) and machine learning to establish a location estimate of the RF beacon.

One of the many inventive technical features of the present invention is the fact that the system is free of a fingerprint map for the sake of localization. Without wishing to limit the invention to any theory or mechanism, it is believed that the technical feature of the present invention advantageously provides for a decrease in overall energy consumption while maintaining a level of accuracy comparable to other distributed signal processing systems that necessitate a fingerprint map. None of the presently known prior references or work has the unique inventive technical feature of the present invention.

One of the goals of the present invention is to provide for an energy-efficient system for the distribution of indoor localization signal processing free of a fingerprint map. The use of statistical inferences, statistical algorithms, and machine learning in place of fingerprint map generation is counterintuitive. The reason that it is counterintuitive is because the power to run such algorithms, as conventionally implemented, assume the infrastructure processing units are powered with a wired source not battery operated constantly for periods extending into years, and one would expect greater energy consumption as a result. Thus, the use of statistical inferences, statistical algorithms, and machine learning in place of fingerprint map generation is counterintuitive. Surprisingly, the present method is more energy efficient than prior methods because the algorithms used are deconstructed in a manner as to achieve the highest energy conservation possible.

Another inventive technical feature of the present invention is the combination of the generation of estimated certainty values for a plurality of frequency estimates, a plurality of first distance estimates, and a plurality of second distance estimates in a cloud server and the obviation of fingerprint map generation. Without wishing to limit the invention to any theory or mechanism, it is believed that the technical feature of the present invention advantageously provides for a decrease in overall energy consumption while maintaining a level of accuracy comparable to other distributed signal processing systems. None of the presently known prior references or work has the unique inventive technical feature of the present invention.

Furthermore, the generation of estimated certainty values for a plurality of frequency estimates, a plurality of first distance estimates, and a plurality of second distance estimates in a cloud server in place of fingerprint map generation is counterintuitive. The reason that it is counterintuitive is because the number of wired detection point/access points in a given infrastructure needs to be very large for a given area to make a non-finger print platform approach viable, so large as to be impractical from a time and energy perspective to calculate certainty values for every detection point in the infrastructure instead of utilizing a fingerprint map and less detection points. Thus, the generation of estimated certainty values for a plurality of frequency estimates, a plurality of first distance estimates, and a plurality of second distance estimates is counterintuitive. Surprisingly, the calculation of certainty values in the present invention is more energy efficient than fingerprint map generation, despite the vast number of factors involved in said calculation.

Another inventive technical feature of the present invention is the combination of the use of a deep FEC code technique in a detection point's (DP) transmissions to the cloud server and the obviation of fingerprint map generation. Without wishing to limit the invention to any theory or mechanism, it is believed that the technical feature of the present invention advantageously provides for an increase in the range that a DP can connect to a cloud server, an increase in the overall accuracy of the system, and a decrease in overall energy consumption. None of the presently known prior references or work has the unique inventive technical feature of the present invention.

Furthermore, the combination of the use of a deep FEC code technique in a DP's transmissions to the cloud server and the obviation of fingerprint map generation is counterintuitive. The reason that it is counterintuitive is because current detection/access points are designed to function to transfer the maximum data in the fastest time possible whereas deep FEC inherently slows down data transfer significantly and would not be expected to reach the same level of accuracy as prior systems that employ fingerprinting. Thus, the use of deep FEC code transmissions and the obviation of fingerprint map generation is counterintuitive. Surprisingly, the deep FEC transmission method used in combination with the present system is far more energy efficient than if a fingerprint map had been used in the system, while maintaining a comparable level of accuracy.

The present invention is additionally directed to radio-frequency (RF) tags waking from energy-efficient hibernation to receive and send transmissions to detection points (DPs) for the sake of energy efficiency. A RF tag may detect that it has moved and passively associate with a DP. Associating with the DP may generate a reveille time in the tag based on the ID of both the tag and the DP. The reveille time may determine when the tag will awaken to receive transmission from the DP or send messages to the DP and may be kept track of by an imprecise clock.

From this point, the present invention has different methods depending on whether a tag will be receiving or sending transmissions. In the case of a tag receiving transmissions, on a constant interval of about 30 seconds, kept track of by a precise clock, a DP may transmit a beacon comprising an address for every possible address so that it may send its data to any tag that may be passively associated with the DP. At the reveille time, the tag may awaken and receive the beacon from the DP it has associated with and read the address to confirm that it is receiving from the correct DP. Upon accepting the beacons, the tag may execute a phase lock on its imprecise clock based on the time between when the beacon was received and when it was expected to be received in order to correct the imprecise clock and sync with the precise clock of the DP. The tag may then return to a hibernation state until the next reveille time causes it to wake again. The tag saves power by remaining active only when necessary and hibernating at all other points.

In the case of a tag sending transmissions, the tag may awaken at the reveille time using a sloppy clock. The tag may transmit a beacon comprising an address to an associated DP, which the DP may then receive. The DP may confirm the address of the beacon and delay its timing for future transmissions to the tag. The delay may be calculated by a precise clock and is equal to a difference between when the beacon was received to when the beacon was expected to be received. The tag may then return to a hibernation state until the next reveille time causes it to wake again. The tag saves power by remaining active only when necessary and hibernating at all other points.

After both of these cases, a tag may update its location to a DP that it has associated with by transmitting a plurality of transmissions. This may be done on an interval of about 15 minutes, meaning that a DP in a plurality of DPs may only know the exact location of the associated tag every 15 minutes.

The present invention is additionally directed to two-way authentication between an RF tag and a DP for the sake of security. The DP may generate two copies of a prime integer to act as a first challenge and a second challenge. The first challenge may be transmitted to the RF tag, comprising a root of trust with an encryption key. The tag may encrypt the first challenge using its encryption key, and transmit the encrypted challenge back to the DP. Upon receiving the encrypted challenge, the DP sends the encrypted challenge to a cloud application which searches through its contained database of every encryption key mapped to every tag. When the encryption key corresponding to the tag is found in the database the cloud application may use the encryption key on the second challenge and compare the tag's encrypted first challenge to the DP's encrypted second challenge, and if the challenges are equal then the authentication procedure has passed.

One of the many inventive technical features of the present invention is the scattershot of beacons transmitted by a DP, along with the awakening of a RF tag to receive the correct beacons at the correct time. Without wishing to limit the invention to any theory or mechanism, it is believed that the technical feature of the present invention advantageously provides for a decrease in overall energy consumption due to the fact that the RF tag is synced to awaken and use power only when the DP is transmitting to it, and is synced to hibernate in between intervals. None of the presently known references or work has the unique inventive technical feature of the present invention.

Furthermore, the scattershot of beacons transmitted by a DP, along with the awakening of a RF tag to receive the correct beacons at the correct time is counterintuitive. The reason that it is counterintuitive is because prior systems currently considered to offer the lowest possible power approach (such as Bluetooth low energy) would have the tags "transmit before listening" whereas this system has the tags "listen before transmitting." Thus, the prior art teaches away from the present invention and utilizing a "listen before transmitting" system is counterintuitive. Despite the prior art teaching away from the present invention, the latter is more energy efficient while maintaining a comparable level of accuracy.

Another inventive technical feature of the present invention is the definition of the recipient array as a series of bits with the bit associated with a RF tag set to 1 and all other bits set to 0. Without wishing to limit the invention to any theory or mechanism, it is believed that the technical feature of the present invention advantageously provides for a decrease in energy consumption by RF tags because it only needs to reference one bit instead of translating a binary number into a different form and referencing the result. None of the presently known prior references or work has the unique inventive technical feature of the present invention.

Furthermore, the definition of the recipient array as a series of bits with the bit associated with a RF tag set to 1 and all others set to 0 is counter intuitive. The reason that it is counter intuitive is because existing low power systems such as Bluetooth low energy transfer full ID information every time an equivalent tag wake up procedure is executed. Since unique ID bit fields can be 128 bits or more (for example a Bluetooth Low Energy UUID is 128 bits), one of ordinary skill in the art would expect this approach to use much more power and significantly reduce channel capacity if there are many tags. Thus, the recipient array format of the present invention is counterintuitive. Surprisingly, the energy used to transmit the large recipient arrays was balanced out by the savings in energy by simply having the tags reference an individual bit in the array instead of translating the number into a different form, resulting in lower energy consumption overall.

Another inventive technical feature of the present invention is the combination of a RF tag adjusting its clock to wake up at the right time to receive transmissions from a DP. Without wishing to limit the invention to any theory or mechanism, it is believed that the technical feature of the present invention advantageously provides for greater accuracy in the system of energy-efficient hibernation. None of the presently known prior references or work has the unique inventive technical feature of the present invention.

Furthermore, the RF tag adjusting its clock to wake up at the right time to receive transmissions from the DP is counterintuitive. The reason that it is counterintuitive is because in systems using unlicensed technologies such as WiFi or Bluetooth the long term clock accuracy and performance (such as drift and phase noise) of both tags and equivalent access points are not considered at system level as one skilled in the art would expect frequent clock adjustments to remedy these issues to consume excessive power and possibly reducing overall accuracy. For existing unlicensed systems and their corresponding standards, such parameters are only considered during active interactions and not considered over the longer term since unlicensed standard systems by nature rely on unsynchronized and coordinated network elements. Thus, the frequent adjustment of clocks in the tags is counterintuitive because prior art teaches away from this technique. Despite prior art teaching away from the present invention, the latter is able to utilize frequent clock adjustments for better long-term accuracy.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

The features and advantages of the present invention will become apparent from a consideration of the following detailed description presented in connection with the accompanying drawings in which.

DETAILED DESCRIPTION OF THE EMBODIMENTS

Figure 1:
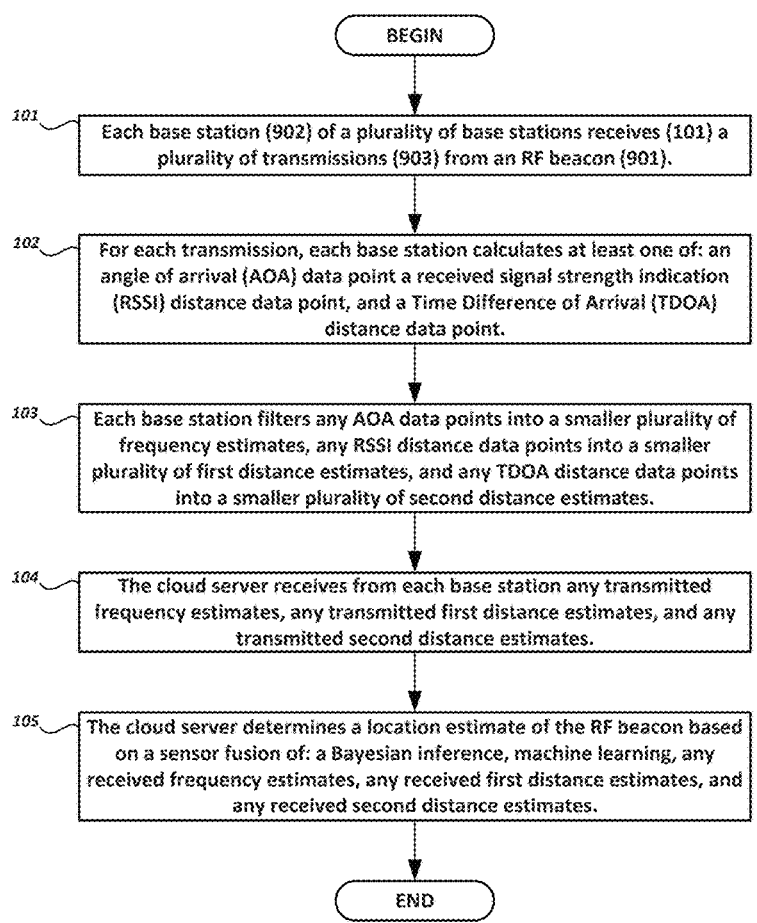
FIG. 1 is a flow chart showing a method of distributed signal processing for radiofrequency (RF) localization using statistical algorithms and machine learning in place of a fingerprint map. Each base station of a plurality of base stations may receive a plurality of transmissions from an RF beacon. Each base station may calculate for each transmission at least one of: an angle of arrival (AOA) data point, a received signal strength indication (RSSI) distance data point, and a Time Difference of Arrival (TDOA) distance data point. Each base station may filter any AOA data points into a smaller plurality of frequency estimates, any RSSI distance data points into a smaller plurality of first distance estimates, and any TDOA distance data points into a smaller plurality of second distance estimates. The AOA data points may be filtered into a smaller plurality of frequency estimates. The RSSI distance data points may be filtered into a smaller plurality of first distance estimates. The TDOA distance data points may be filtered into a smaller plurality of second distance estimates. The cloud server may receive from each base station any transmitted frequency estimates, any transmitted first distance estimates, and any transmitted second distance estimates. The cloud server may determine a location estimate of the RF beacon based on a sensor fusion of: a Bayesian inference, machine learning, any received frequency estimates, any received first distance estimates, and any received second distance estimates.

The following description sets forth numerous specific details (e.g., specific configurations, parameters, examples, etc.) of the disclosed embodiments, examples of which are illustrated in the accompanying drawings. It should be recognized, however, that such description is not intended as a limitation on the scope of the disclosed embodiments, but is intended to elaborate upon the description of these embodiments. It will be evident to a person of ordinary skill in the art that the present invention can be practiced without every specific detail described infra. Moreover, well-known methods, procedures, components, and circuits have not been described in detail so as not to unnecessarily obscure aspects of the embodiments of the present invention.

It is fully contemplated that the features, components, and/or steps described with respect to one embodiment may be combined with the features, components, and/or steps described with respect to other embodiments of the present disclosure. To avoid needless descriptive repetition, one or more components or actions described in accordance with one exemplary embodiment can be used or omitted as applicable from other embodiments. For the sake of brevity, the numerous iterations of these combinations will not be described separately. The same reference numbers may be used to refer to the same or similar elements in different drawings. Alternately, different reference numbers may be used to refer to the same or similar elements in the drawings of different embodiments. Any distinction of an element's reference number in one embodiment from another is not limiting in any way, does not suggest that elements of one embodiment could not be combined with or substituted for elements in another embodiment, and (most importantly) is specifically intended only to facilitate the matching of elements in the disclosure to their corresponding claim recitations.

The figures presented in this patent application (including the angles, proportions of dimensions, etc.) are representative only and the claims are not limited by the dimensions of the figures.

Referring to FIG. 1, the present invention features a method 100 of distributed signal processing for radiofrequency (RF) localization. In some embodiments, the RF modulation scheme may be a close approximation of Gaussian minimum-shift keying (GMSK). In some embodiments, the method may use statistical algorithms and machine learning in place of a fingerprint map. In some embodiments an RF beacon 901 may announce its location through a plurality of transmissions 903 to a plurality of base stations. In some embodiments, each base station 902 of the plurality of base stations may receive 101 the plurality of transmissions 903 from the RF beacon 901. In some embodiments, more than one RF beacon 901 may transmit to the plurality of base stations.

In some embodiments, each base station 902 may measure 102 a transmission 903 and may calculate for each transmission 903 at least one of: an angle of arrival (AOA) data point 904, a received signal strength indication (RSSI) distance data point 905, and a Time Difference of Arrival (TDOA) distance data point 906. In some embodiments, different calculations may be executed on each transmission 903, resulting in different data point sets. The different data point sets may be selected from a group comprising assisted GPS data points, Advanced Forward Link Trilateration (A-FLT) data points, Timing Advance/Network Measurement Report (TA/NMR) data points, and Enhanced Observed Time Difference (E-OTD) data points. The AOA data point 904 of each transmission 903 calculated by each base station 902 may comprise an azimuth and a bearing. Each base station 902 may filter 103 any local data points. Filtering local data may comprise filtering any AOA data points 904 into a smaller plurality of frequency estimates 909, any RSSI distance data points 905 into a smaller plurality of first distance estimates 910, and any TDOA distance data points 906 into a smaller plurality of second distance estimates 911. The AOA data points 904 may be filtered into a smaller plurality of frequency estimates 909 using one or more statistical algorithms 907. The statistical algorithms 907 may be eigen structure algorithms 907 comprising MUltiple Signal Classification (MUSIC), beamscan, and cross-correlation. In some embodiments, the RSSI distance data points 905 may be filtered into a smaller plurality of first distance estimates 910 using a first statistical inference. The first statistical inference may be a Bayesian inference in the form of a linear quadratic estimation 908. In some embodiments, the TDOA distance data points 906 may be filtered into a smaller plurality of second distance estimates 911 using a second statistical inference. The second statistical inference may be a Bayesian inference in the form of a linear quadratic estimation 908. In some embodiments, the linear quadratic estimation 908 may be implemented with a multiplication algorithm based on Homer's method.

In some embodiments, each base station 902 may use a deep FEC code technique to transmit 308 the smaller plurality of frequency estimates 909, the smaller plurality of first distance estimates 910, and the smaller plurality of second distance estimates 911 to the cloud server 912. In some embodiments, the deep FEC code technique may additionally employ an interleaving algorithm. The cloud server 912 may receive 104 from each base station 902 any transmitted frequency estimates 909, any transmitted first distance estimates 910, and any transmitted second distance estimates 911. The cloud server 912 may process 105 a sensor fusion of: a third statistical inference 913, machine learning 914, any received frequency estimates 909, any received first distance estimates 910, and any received second distance estimates 911 into a location estimate 915 of the RF beacon 901. In some embodiments, the third statistical inference 913 may be a Bayesian inference comprising a Sequential Monte Carlo algorithm 913. In some embodiments, the machine learning 914 may be a deep neural network trained with previous data transmitted by the plurality of base stations 902 and time-of-day location patterns to accept frequency estimates 909, first distance estimates 910, and/or second distance estimates 911 as input and return a location estimate 915 as output. In some embodiments, each base station 902 may transmit the frequency estimates 909, the first distance estimates 910, and the second distance estimates 911 to a local server capable of determining the location estimate. In some embodiments, the local server may process the sensor fusion of: the third statistical inference 913, machine learning 914, any received frequency estimates 909, any received first distance estimates 910, and any received second distance estimates 911 into a location estimate 915 of the RF beacon 901. In some embodiments, the third statistical inference 913 may be a Bayesian inference comprising a Sequential Monte Carlo algorithm 913. In some embodiments, the machine learning 914 may be a deep neural network trained with previous data transmitted by the plurality of base stations 902 and time-of-day location patterns to accept frequency estimates 909, first distance estimates 910, and/or second distance estimates 911 as input and return a location estimate 915 as output. In some embodiments, the sensor fusion processed 311 by the cloud server 912 and the local server may comprise additional measurements and/or calculations.

Figure 2:
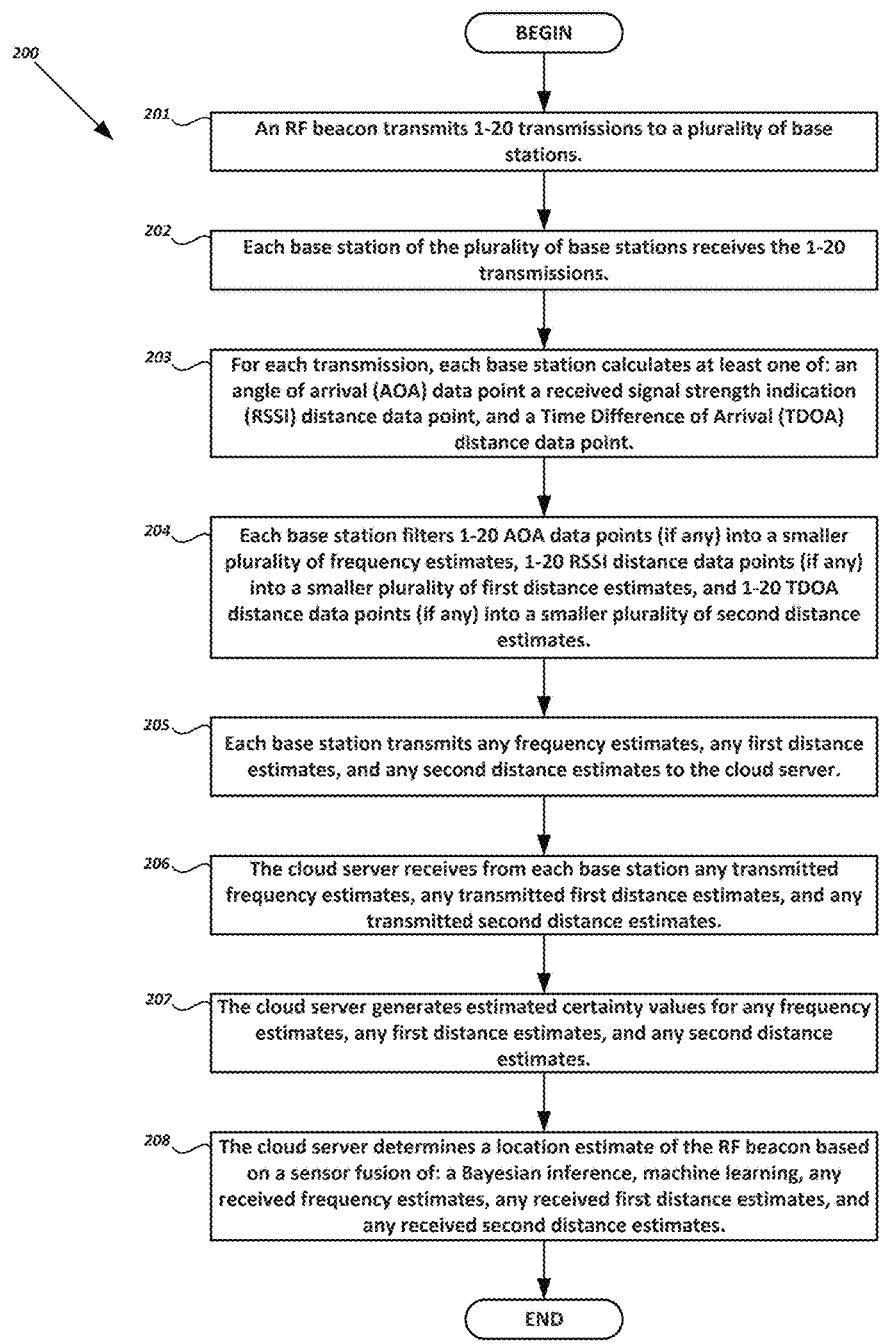
FIG. 2 is a flow chart showing a method of distributed signal processing for RF localization using statistical algorithms and machine learning in place of a fingerprint map. Each base station of a plurality of base stations may receive a plurality of transmissions from an RF beacon. Each base station may calculate for each transmission at least one of: an angle of arrival (AOA) data point, a received signal strength indication (RSSI) distance data point, and a Time Difference of Arrival (TDOA) distance data point. Each base station may filter any AOA data points into a smaller plurality of frequency estimates, any RSSI distance data points into a smaller plurality of first distance estimates, and any TDOA distance data points into a smaller plurality of second distance estimates. The AOA data points may be filtered into a smaller plurality of frequency estimates. The RSSI distance data points may be filtered into a smaller plurality of first distance estimates. The TDOA distance data points may be filtered into a smaller plurality of second distance estimates. The cloud server may receive from each base station any transmitted frequency estimates, any transmitted first distance estimates, and any transmitted second distance estimates. The cloud server may generate estimated certainty values for any frequency estimates, any first distance estimates, and any second distance estimates. The cloud server may determine a location estimate of the RF beacon based on a sensor fusion of: a Bayesian inference, machine learning, any received frequency estimates, any received first distance estimates, and any received second distance estimates.

Referring now to FIG. 2, the present invention features a method 200 of distributed signal processing for RF localization. In some embodiments, the RF modulation scheme may be a close approximation of GMSK. In some embodiments, the method may use statistical algorithms and machine learning in place of a fingerprint map. In some embodiments an RF beacon 901 may announce its location through a plurality of transmissions 903 to a plurality of base stations. The RF beacon may transmit 201 1-20 transmissions 903.

In some embodiments, each base station 902 of the plurality of base stations may receive 202 the 1-20 transmissions 903. Each base station 902 may measure 203 a transmission 903 and may calculate for each transmission 903 at least one of: an AOA data point 904, a RSSI distance data point 905, and a TDOA distance data point 906. In some embodiments, different calculations may be executed on each transmission 903, resulting in different data point sets. The different data point sets may be selected from a group comprising assisted GPS data points, A-FLT data points, TA/NMR data points, and E-OTD data points. The AOA data point 904 of each transmission 903 calculated by each base station 902 may comprise an azimuth and a bearing. In some embodiments, each base station 902 may filter 204 1-20 AOA data points 904 (if any) into a smaller plurality of frequency estimates 909, 1-20 RSSI distance data points 905 (if any) into a smaller plurality of first distance estimates 910, and 1-20 TDOA distance data points 906 (if any) into a smaller plurality of second distance estimates 911. In some embodiments, the 1-20 AOA data points 904 may be filtered into a smaller plurality of frequency estimates 909 using one or more statistical algorithms 907. The statistical algorithms 907 may be eigen structure algorithms 907 comprising MUSIC, beamscan, and cross-correlation. In some embodiments, the 1-20 first distance data points 905 may be filtered into a smaller plurality of first distance estimates 910 using a first statistical inference. The first statistical inference may be a Bayesian inference in the form of a linear quadratic estimation 908. In some embodiments, the 1-20 second distance data points 906 may be filtered into a smaller plurality of second distance estimates 911 using a second statistical inference. The second statistical inference may be a Bayesian inference in the form of a linear quadratic estimation 908. The linear quadratic estimation 908 may be implemented with a multiplication algorithm based on Horner's method. In some embodiments, more than 20 transmissions are transmitted by the RF beacon 901 received by the base station 902, and the number of AOA data points 904, RSSI distance data points 905, and TDOA distance data points 906 may be equal to the number of transmissions.

In some embodiments, each base station 902 may transmit 205 the smaller plurality of frequency estimates 909 (if any), the smaller plurality of first distance estimates 910 (if any), and the smaller plurality of second distance estimates 911 (if any). Each base station 902 may use a deep FEC technique to transmit 308 the smaller plurality of frequency estimates 909, the smaller plurality of first distance estimates 910, and the smaller plurality of second distance estimates 911 to the cloud server 912. In some embodiments, the deep FEC code technique may additionally employ an interleaving algorithm. In some embodiments, the cloud server 912 may receive 206 from each base station 902 any frequency estimates 909, any first distance estimates 910, and any second distance estimates 911. The cloud server 912 may generate 207 estimated certainty values for any frequency estimates 909, any first distance estimates 910, and any second distance estimates 911. The cloud server 912 may then process 208 a sensor fusion of: a third statistical inference 913, machine learning 914, any received frequency estimates 909, any received first distance estimates 910, and any received second distance estimates 911 into a location estimate 915 of the RF beacon 901. In some embodiments, the third statistical inference 913 may be a Bayesian inference comprising a Sequential Monte Carlo algorithm 913. In some embodiments, the machine learning 914 may be a deep neural network trained with previous data transmitted by the plurality of base stations 902 and time-of-day location patterns to accept frequency estimates 909, first distance estimates 910, and/or second distance estimates 911 as input and return a location estimate 915 as output. In some embodiments, each base station 902 may transmit the frequency estimates 909, the first distance estimates 910, and the second distance estimates 911 to a local server capable of determining the location estimate. In some embodiments, the local server may process the sensor fusion of: the third statistical inference 913, machine learning 914, any received frequency estimates 909, any received first distance estimates 910, and any received second distance estimates 911 into a location estimate 915 of the RF beacon 901. In some embodiments, the third statistical inference 913 may be a Bayesian inference comprising a Sequential Monte Carlo algorithm 913. In some embodiments, the machine learning 914 may be a deep neural network trained with previous data transmitted by the plurality of base stations 902 and time-of-day location patterns to accept frequency estimates 909, first distance estimates 910, and/or second distance estimates 911 as input and return a location estimate 915 as output. In some embodiments, the sensor fusion processed 311 by the cloud server 912 and the local server may comprise additional measurements and/or calculations.

Figure 3:
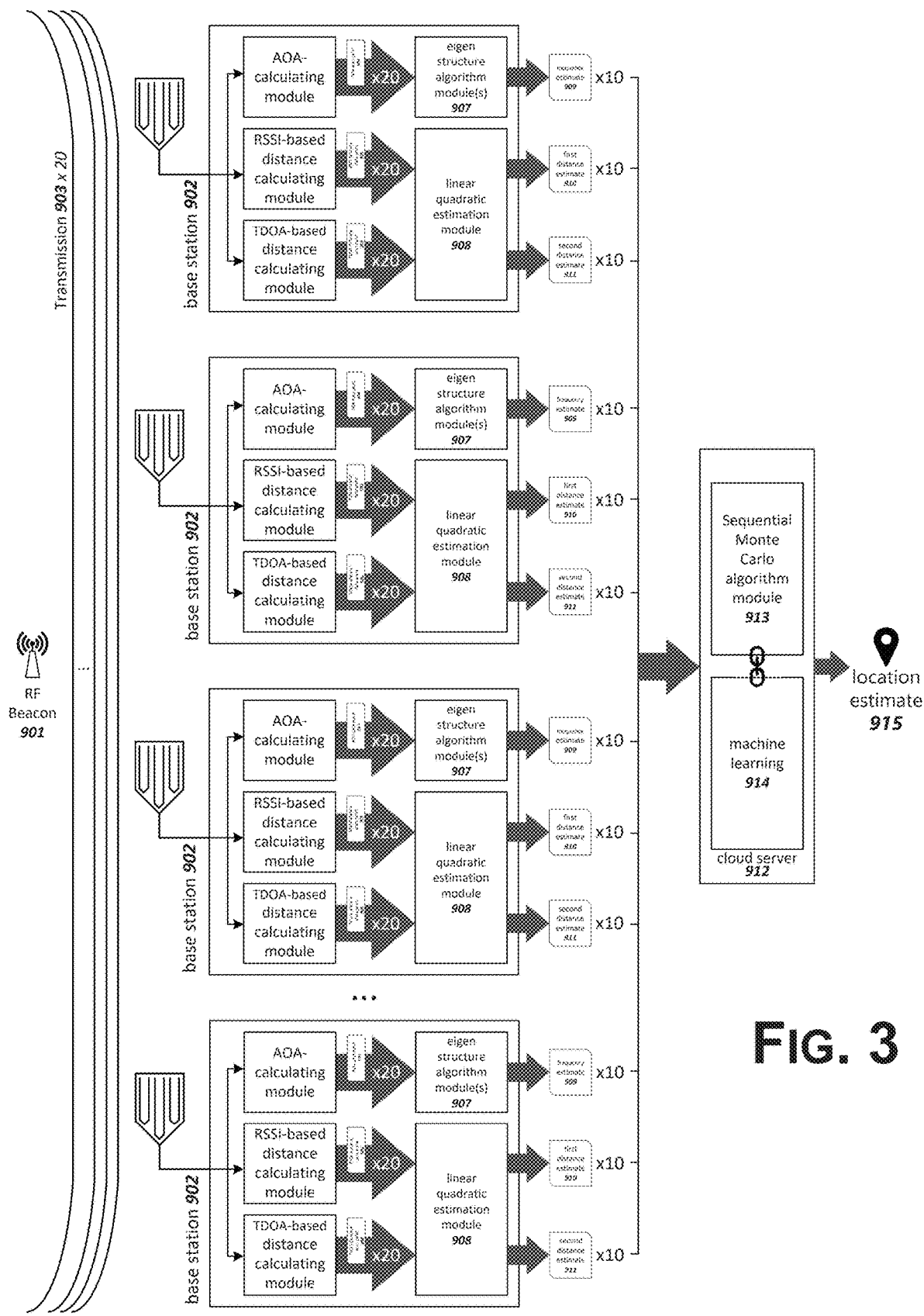
FIG. 3 is a diagram of an exemplary system of distributed signal processing for RF indoor localization to determine an estimated location of an RF beacon, wherein local signal processing comprises one or more eigen structure algorithms and/or linear quadratic estimation and cloud-based signal processing comprises a nonlinear Bayesian inference and machine learning.
Figure 4:
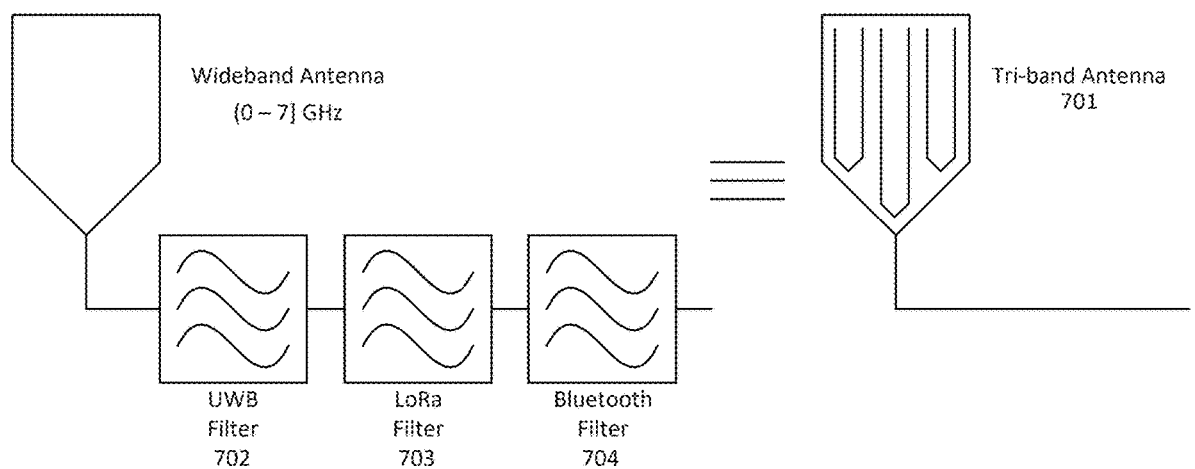
FIG. 4 is a diagram of a tri-band antenna that may be employed in a cloud server in a system of distributed signal processing for RF indoor localization to determine an estimated location. The tri-band antenna may comprise a wideband antenna with a range of 0-7 GHz. The wideband antenna may comprise a UWB filter, a LoRa filter, and a Bluetooth filter.
Figure 4:
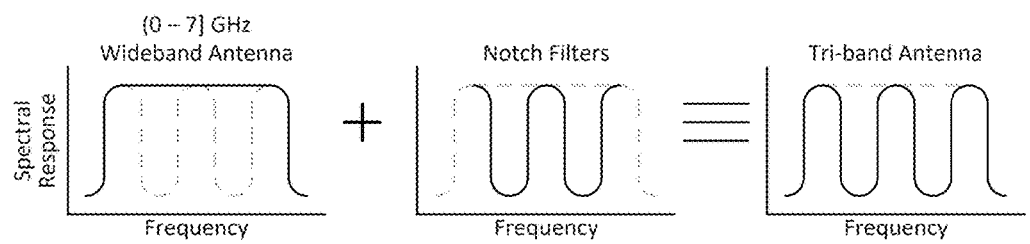
Figure 5:
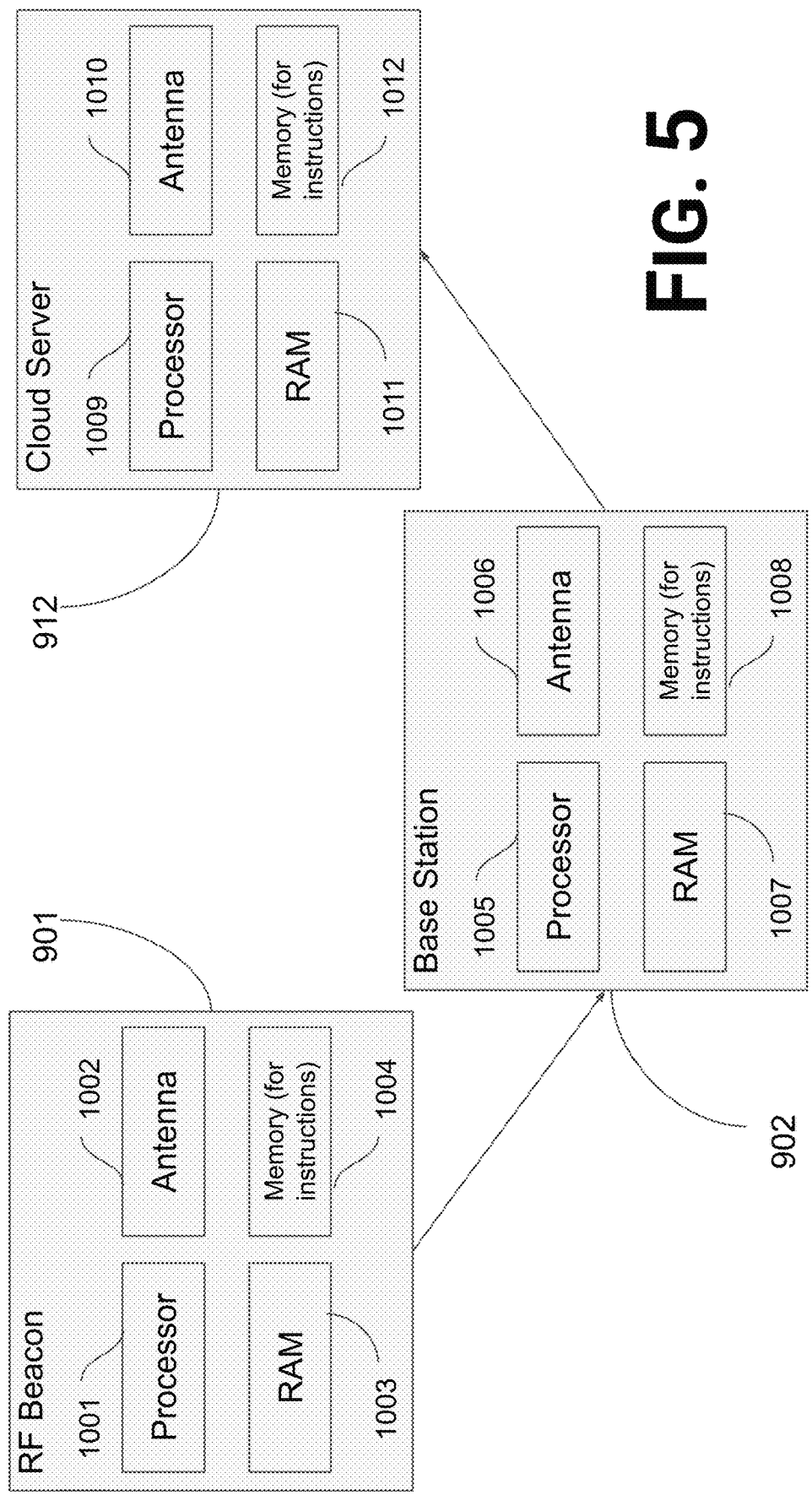
FIG. 5 is a diagram of a system of distributed signal processing for RF indoor localization to determine an estimated location. A RF beacon may comprise a first processor 1001, a first antenna, a first RAM device, and a memory device to hold instructions. A base station may comprise a second processor, a second antenna, a second RAM device, and a second memory device to hold instructions. A cloud server may comprise a third processor, a third antenna, a third RAM device, and a third memory device to hold instructions.

Referring to FIG. 3, a specific embodiment of the present invention may feature an energy-efficient method 300 of distributed signal processing for Bluetooth Low Energy (BLE) localization, wherein the method may use statistical algorithms and machine learning in place of a fingerprint map. In some embodiments a BLE device 901 may announce its location through a plurality of pings 903 to a plurality of detection points. The 1-20 pings may be received by each detection point (DP) 902 in the plurality of DPs. Each DP 902 in the plurality of DPs may measure each of the 1-20 pings the DP 902 received. The processing procedure may comprise each DP 902 calculating 303 an Angle of Arrival data point 904 of the ping, measuring 304 an RSSI of the ping 903, and determining 305 an RSSI-based distance data point 905 of the BLE device 901. In some embodiments, different calculations may be executed on each ping 903, resulting in different data point sets. The different data point sets may be selected from a group comprising assisted GPS data points, A-FLT data points, TA/NMR data points, and E-OTD data points. The method may further comprise each DP 902 consolidating 306 the 1-20 calculated Angles of Arrival into a smaller plurality of frequency estimates 907 using a statistical algorithm 906. The statistical algorithm 906 may be an eigen structure algorithm 906 comprising MUltiple Signal Classification (MUSIC). The method may further comprise each DP 902 consolidating 307 the 1-20 RSSI-based distance data points 905 of the BLE device 901 into a smaller plurality of distance estimates using a first statistical inference 910. The first statistical inference 910 may be a Bayesian inference comprising a linear quadratic estimation. The smaller plurality of distance estimates may be Bayesian distance estimates. In some embodiments, more than 20 transmissions are transmitted by the BLE device 901 and received by the detection points 902, and the number of AOA data points 904, RSSI distance data points 905, and TDOA distance data points 906 may be equal to the number of transmissions.

The method of the specific embodiment may further comprise each DP 902 transmitting 308 the smaller plurality of Bayesian distance estimates and the smaller plurality of frequency estimates 907 to the cloud server 912. The transmission may use a deep FEC code, and the deeply FEC coded transmission may be LoRa signal. In some embodiments, the deep FEC code technique may additionally employ an interleaving algorithm. The cloud server 912 may receive 309 the smaller plurality of distance estimates and the smaller plurality of frequency estimates 907 from each DP 902 of the plurality of DPs. The cloud server 912 may generate 310 estimated certainty values to establish the quality levels of the smaller plurality of distance estimates and the smaller plurality of frequency estimates 907 of each DP 902 of the plurality of DPs. The method may further comprise the cloud server 912 processing 311 a sensor fusion of: a second statistical inference, machine learning, any frequency estimates, and any distance estimates into a location estimate of the BLE device 901. The second statistical inference 913 may be a Bayesian inference 913 comprising a Sequential Monte Carlo algorithm 913. The machine learning 914 may be a deep neural network trained with previous data transmitted by the plurality of base stations 902 and time-of-day location patterns to accept frequency estimates 909, first distance estimates 910, and/or second distance estimates 911 as input and return a location estimate 915 as output. In the specific embodiment of the present invention, a DP 902 in the plurality of DPs may use, on average, less than 5 mW of energy over 1 week of activity. In some embodiments, each DP 902 may transmit the frequency estimates 909, the first distance estimates 910, and the second distance estimates 911 to a local server capable of determining the location estimate. In some embodiments, the local server may process the sensor fusion of: the third statistical inference 913, machine learning 914, any received frequency estimates 909, any received first distance estimates 910, and any received second distance estimates 911 into a location estimate 915 of the RF beacon 901. In some embodiments, the third statistical inference 913 may be a Bayesian inference comprising a Sequential Monte Carlo algorithm 913. In some embodiments, the machine learning 914 may be a deep neural network trained with previous data transmitted by the plurality of DPs 902 and time-of-day location patterns to accept frequency estimates 909, first distance estimates 910, and/or second distance estimates 911 as input and return a location estimate 915 as output. In some embodiments, the sensor fusion processed 311 by the cloud server 912 and the local server may comprise additional measurements and/or calculations.

A cloud server 912 may comprise at least one of network computing environments known in the art with computer system configurations further comprising personal computers, desktop computers, laptop computers, rack computers, mainframes and the like, any of which comprises at least a processor 1009 for executing instructions, RAM 1011, and memory 1012 upon which is stored instructions executable by the processor 1009. The cloud server 912 may also be implemented in distributed system environments where operations are delegated to and/or shared between local and remote computer systems across a network. In a distributed system environment, program modules may be located in both local and remote memory storage devices.

A base station 902 may be (by way of non-limiting example) any wireless device, comprising a processor 1005 for executing instructions, RAM 1007, memory 1008 upon which is stored instructions executable by the processor, and an antenna 1006. Those skilled in the art will appreciate that a wireless device may include personal computers, desktop computers, laptop computers, message processors, handheld devices, multi-processor systems, microprocessor-based or programmable consumer electronics, network PCs, minicomputers, mainframe computers, mobile telephones, PDAs, pagers, routers, access points, transceivers, and the like.

The antenna 1006 may be a wideband antenna 701 configured with a bandwidth greater than 0 GHz and less than or equal to 7 GHz. The wideband antenna 701 may be configured with filters to distinguish multiple bands of radiofrequencies. The bands of radiofrequencies may include non-limiting examples such as ultra-wideband (UWB) 702, an LPWAN (such as LoRa) 703, and Bluetooth 704. Ultra-wideband 702 may comprise frequencies exceeding the lesser of 500 MHz or 20% of the arithmetic center frequency. The LPWAN 703 may comprise 433 MHz, 868 MHz, and 915 MHz frequencies. Bluetooth 704 may comprise frequencies ranging from 2.400 GHz-2.4835 GHz (including guard bands).

Instructions that cause at least one processing circuit to perform one or more operations are "computer-executable." Within the scope of the present invention, "computer-readable memory," "computer-readable storage media," and the like comprises two distinctly different kinds of computer-readable media: physical storage media that stores computer-executable instructions and transmission media that carries computer-executable instructions. Physical storage media includes RAM and other volatile types of memory; ROM, EEPROM and other non-volatile types of memory; CD-ROM, CD-RW, DVD-ROM, DVD-RW and other optical disk storage; magnetic disk storage or other magnetic storage devices; and any other tangible medium that can store computer-executable instructions that can be accessed and processed by at least one processing circuit. Transmission media can include signals carrying computer-executable instructions over a network to be received by a general-purpose or special-purpose computer. Thus, it is emphasized that (by disclosure or recitation of the exemplary term "non-transitory") embodiments of the present invention expressly exclude signals carrying computer-executable instructions.

However, it should be understood that once a signal carrying computer-executable instructions is received by a computer, the type of computer-readable storage media transforms automatically from transmission media to physical storage media. This transformation may even occur early on in intermediate memory such as (by way of example and not limitation) a buffer in the RAM of a network interface card, regardless of whether the buffer's content is later transferred to less volatile RAM in the computer. Thus, devices that merely repeat a signal are contemplated by the embodiments of the present invention, even though the media that carry the signal between such devices and the signal itself are expressly not included within the claim scope. Thus, it should be understood that "non-transitory computer-readable storage media" may be used herein instead of simply "physical storage media" or "physical computer-readable storage media" in order to underscore that even transmission media necessarily involves eventual transformation into physical storage media and to therefore capture all embodiments where the computer-readable instructions are stored in physical storage media—even if only temporarily before transforming back into transmission media.

In some embodiments, when executed by the processor 1009 of the cloud server 912, the instructions may cause the processor 1009 to perform operations. The operations may comprise receiving 104 any transmitted any transmitted frequency estimates 909, first distance estimates 910, and any transmitted second distance estimates 911; and processing 105, by the cloud server 912, a sensor fusion of: a statistical inference 913, machine learning 914, any received frequency estimates 909, any received first distance estimates 910, and any received second distance estimates 911 into a location estimate 915 of the RF beacon 901. The statistical inference may be a Bayesian inference.

In other embodiments, when executed by the processor 1009 of the cloud server 912, the instructions may cause the processor 1009 to perform operations. The operations may comprise receiving 206 any frequency estimates 909, any first distance estimates 910, and any second distance estimates 911; generating 207 estimated certainty values for any frequency estimates 909, any first distance estimates 910, and any second distance estimates 911; and processing 208 a sensor fusion of: a statistical inference 913, machine learning 914, any frequency estimates 909, any first distance estimates 910, and any second distance estimates 911 into a location estimate 915 of the RF beacon 901.

In some embodiments, the statistical inference 913 is a Bayesian 913 inference comprising a Sequential Monte Carlo algorithm 913. In some embodiments, the machine learning 914 may be a deep neural network trained with previous data transmitted by the plurality of base stations 902 and time-of-day location patterns to accept frequency estimates 909, first distance estimates 910, and/or second distance estimates 911 as input and return a location estimate 915 as output.

In some embodiments, when executed by the processor 1005 of the base station 902, the instructions may cause the processor 1005 to perform operations. The operations may comprise receiving 101 a plurality of transmissions 903 from an RF beacon 901; measuring 102 a transmission 903; calculating for each transmission 903 at least one of: an AOA data point 904, a RSSI distance data point 905, and a TDOA distance data point 906; and filtering 103 any AOA data points 904 into a smaller plurality of frequency estimates 909, any RSSI distance data points 905 into a smaller plurality of first distance estimates 910, and any TDOA distance data points 906 into a smaller plurality of second distance estimates 911. In some embodiments, different calculations may be executed on each transmission 903, resulting in different data point sets. The different data point sets may be selected from a group comprising assisted GPS data points, A-FLT data points, TA/NMR data points, and E-OTD data points.

In other embodiments, when executed by the processor 1005 of the base station 902, the instructions may cause the processor 1005 to perform operations. The operations may comprise receiving 202 1-20 transmissions 903; measuring a transmission 903; calculating 203 for each transmission 903 at least one of: an AOA data point 904, a RSSI distance data point 905, and a TDOA distance data point 906; filtering 204 1-20 AOA data points 904 (if any) into a smaller plurality of frequency estimates 909, 1-20 RSSI distance data points 905 (if any) into a smaller plurality of first distance estimates 910, and 1-20 TDOA distance data points 906 (if any) into a smaller plurality of second distance estimates 911; and transmitting 205 the smaller plurality of frequency estimates 909 (if any), the smaller plurality of first distance estimates 910 (if any), and the smaller plurality of second distance estimates 911 (if any). In some embodiments, more than 20 transmissions are received by the base station 902, and the number of AOA data points 904, RSSI distance data points 905, and TDOA distance data points 906 may be equal to the number of transmissions.

In some embodiments, the AOA data point 904 of each transmission 903 calculated by each base station 902 comprises an azimuth and a bearing. In some embodiments, the AOA data points 904 are filtered into a smaller plurality of frequency estimates 909 using one or more statistical algorithms 907. In some embodiments, the statistical algorithms 907 may be eigen structure algorithms 907 comprising MUSIC, beamscan, and cross-correlation. In some embodiments, the first distance data points 905 are filtered into a smaller plurality of first distance estimates 910 using a linear quadratic estimation 908. In some embodiments, the second distance data points 906 are filtered into a smaller plurality of second distance estimates 911 using a linear quadratic estimation 908. In some embodiments, the linear quadratic estimation 908 is implemented with a multiplication algorithm based on Horner's method. In some embodiments, each base station 902 uses a deep FEC coded technique to transmit 308 the smaller plurality of frequency estimates 909, the smaller plurality of first distance estimates 910, and the smaller plurality of second distance estimates 911 to the cloud server 912. In some embodiments, the deep FEC code technique may additionally employ an interleaving algorithm.

In some embodiments, when executed by the processor 1001 of the RF beacon 901, the instructions may cause the processor 1001 to perform operations. The operations may comprise announcing a location by transmitting 101 a plurality of transmissions 903. In some embodiments, the RF modulation scheme is a close approximation of GMSK.

In other embodiments, when executed by the processor 1001 of the RF beacon 901, the instructions may cause the processor 1001 to perform operations. The operations may comprise announcing a location by transmitting 101 1-20 transmissions 903. In some embodiments, the RF modulation scheme is a close approximation of GMSK. In some embodiments, more than 20 transmissions 903 are transmitted by the RF beacon 901.

The invention claimed is:

1. An energy-efficient method (100) of distributed signal processing for radiofrequency (RF) localization, wherein statistical algorithms and machine learning are used in place of a fingerprint map, the method comprising:

A. announcing, by an RF beacon (901), a location of said RF beacon (901) through a plurality of transmissions (903) to a plurality of base stations;
B. receiving (101), by each base station (902) of the plurality of base stations, the plurality of transmissions (903) from the RF beacon (901);
C. measuring (102), by each base station (902) of the plurality of base stations, each transmission of the plurality of transmissions;
D. calculating (102) for each transmission (903), by each base station (902), at least one of: an angle of arrival (AOA) data point (904), a received signal strength indication (RSSI) distance data point (905), and a Time Difference of Arrival (TDOA) distance data point (906);
E. filtering (103), by each base station (902), any AOA data points, any RSSI distance data points, and any TDOA distance data points, wherein filtering comprises:
   i. filtering (103), by each base station (902), any AOA data points (904) into a smaller plurality of frequency estimates (909),
   ii. filtering (103), by each base station (902), any RSSI distance data points (905) into a smaller plurality of first distance estimates (910), and
   iii. filtering (103), by each base station (902), any TDOA distance data points (906) into a smaller plurality of second distance estimates (911);
F. receiving (104), by a cloud server (912) from each base station (902), any transmitted frequency estimates (909), any transmitted first distance estimates (910), and any transmitted second distance estimates (911); and
G. processing (105), by the cloud server (912), a sensor fusion of: a statistical inference (913), machine learning (914), any received frequency estimates (909), any received first distance estimates (910), and any received second distance estimates (911) into a location estimate (915) of the RF beacon (901).

2. The method of claim 1, wherein the AOA data points (904) are filtered into a smaller plurality of frequency estimates (909) using one or more statistical algorithms (907).

3. The method of claim 2, wherein the RSSI distance data points (905) and the TDOA distance data points (906) are filtered into a smaller plurality of first distance estimates (910) and a smaller plurality of second distance estimates (911), respectively, each using a linear quadratic estimation (908).

4. The method of claim 1, wherein the statistical inference is a Bayesian inference (913) comprising a Sequential Monte Carlo algorithm (913).

5. The method of claim 2, wherein the statistical algorithms (907) are eigen structure algorithms comprising MUltiple Signal Classification (MUSIC), beamscan, and cross-correlation.

6. The method of claim 5, wherein each base station (902) uses a deep forward error correction (FEC) code technique to transmit (308) the smaller plurality of frequency estimates (909), the smaller plurality of first distance estimates (910), and the smaller plurality of second distance estimates (911) to the cloud server (912).

7. The method of claim 6, wherein the AOA data point (904) of each transmission (903) calculated by each base station (902) comprises an azimuth and a bearing.

8. The method of claim 7, wherein the machine learning (914) is a deep neural network trained with previous data transmitted by the plurality of base stations (902) and time-of-day location patterns.

9. The method of claim 8, wherein the linear quadratic estimation (908) is implemented with a multiplication algorithm based on Homer's method.

10. The method of claim 9, wherein the RF modulation scheme is a close approximation of Gaussian minimum-shift keying (GMSK).

11. An energy-efficient system of distributed signal processing for radiofrequency (RF) localization, wherein statistical algorithms and machine learning are used in place of a fingerprint map, the system comprising:
A. an RF beacon (901):
   i. a first processor (1001) capable of executing computer-executable instructions,
   ii. a first antenna (1002), and
   iii. a first memory device (1004) comprising computer-executable instructions for:
     a. announcing a location of the RF beacon (901) by transmitting (101) a plurality of transmissions (903);
B. a base station (902):
   i. a second processor (1005) capable of executing computer-executable instructions,
   ii. a second antenna (1006), and
   iii. a second memory device (1008) comprising computer-executable instructions for:
     a. receiving (101) a plurality of transmissions (903) from an RF beacon (901),
     b. measuring (102) a transmission;
     c. calculating, for each transmission (903) at least one of: an angle of arrival (AOA) data point (904), a received signal strength indication (RSSI) distance data point (905), and a Time Difference of Arrival (TDOA) distance data point (906), and
     d. filtering (103) any AOA data points (904) into a smaller plurality of frequency estimates (909), any RSSI distance data points (905) into a smaller plurality of first distance estimates (910), and any TDOA distance data points (906) into a smaller plurality of second distance estimates (911); and
C. a cloud server (912):
   i. a third processor (1009) capable of executing computer-executable instructions,
   ii. a third antenna (1010), and
   iii. a third memory device (1012) comprising computer-executable instructions for:
     a. receiving (104) any transmitted any transmitted frequency estimates (909), first distance estimates (910), and any transmitted second distance estimates (911), and
     b. processing (105), by the cloud server (912), a sensor fusion of: a statistical inference (913), machine learning (914), any received frequency estimates (909), any received first distance estimates (910), and any received second distance estimates (911) into a location estimate (915) of the RF beacon (901).

12. The system of claim 11, wherein the AOA data points (904) are filtered into a smaller plurality of frequency estimates (909) using one or more statistical algorithms (907).

13. The system of claim 12, wherein the RSSI distance data points (905) and the TDOA data points (906) are filtered into a smaller plurality of first distance estimates (910) and a smaller plurality of second distance estimates (911), respectively, each using a linear quadratic estimation (908).

14. The system of claim 13, wherein the statistical inference is a Bayesian inference (913) comprising a Sequential Monte Carlo algorithm (913).

15. The system of claim 14, wherein the statistical algorithms (907) are eigen structure algorithms comprising MUSIC, beamscan, and cross-correlation.

16. The system of claim 15, wherein each base station (902) uses a deep FEC to transmit (308) the smaller plurality of frequency estimates (909), the smaller plurality of first distance estimates (910), and the smaller plurality of second distance estimates (911) to the cloud server (912).

17. The system of claim 16, wherein the AOA data point (904) of each transmission (903) calculated by each base station (902) comprises an azimuth and a bearing.

18. The system of claim 17, wherein the machine learning (914) is a deep neural network trained with previous data transmitted by the plurality of base stations (902) and time-of-day location patterns.

19. The system of claim 18, wherein the linear quadratic estimation (908) is implemented with a multiplication algorithm based on Homer's system.

20. The system of claim 19, wherein the RF modulation scheme is a close approximation of GMSK.

\* \* \* \* \*